(12) United States Patent
Escobar et al.

(10) Patent No.: US 6,267,803 B1
(45) Date of Patent: Jul. 31, 2001

(54) ABRASIVE WEAR BARRIER

(75) Inventors: Miguel Escobar; Mark A. Swiedom; Weiping Zheng, all of Lewistown, ME (US)

(73) Assignee: International Paper Company, Purchase, NY (US)

( * ) Notice: Subject to any disclaimer, the term of this patent is extended or adjusted under 35 U.S.C. 154(b) by 0 days.

(21) Appl. No.: 09/105,884

(22) Filed: Jun. 26, 1998

Related U.S. Application Data

(60) Provisional application No. 60/055,727, filed on Jun. 26, 1997.

(51) Int. Cl.[7] .................................................. B01D 45/12
(52) U.S. Cl. ................................ 95/271; 55/337; 55/435; 55/459.1
(58) Field of Search ......................... 55/435, 436, 459.1, 55/337; 95/271

(56) References Cited

U.S. PATENT DOCUMENTS

| | | | |
|---|---|---|---|
| 912,686 | * | 2/1909 | Keeney .................................... 55/435 |
| 2,999,563 | * | 9/1961 | Wehn et al. ............................. 55/435 |
| 3,004,627 | * | 10/1961 | Wehn ....................................... 55/435 |
| 3,273,320 | * | 9/1966 | Delaune et al. ......................... 55/435 |
| 3,367,090 | * | 2/1968 | Dingus ..................................... 55/435 |
| 3,902,601 | * | 9/1975 | Townley .................................. 55/435 |
| 3,988,239 | * | 10/1976 | Malina ..................................... 55/435 |
| 4,004,615 | * | 1/1977 | Stern et al. ............................... 55/435 |
| 4,125,385 | * | 11/1978 | Rado et al. .............................. 55/435 |
| 4,229,194 | * | 10/1980 | Baillie ...................................... 55/435 |

* cited by examiner

Primary Examiner—Duane S. Smith
(74) Attorney, Agent, or Firm—Dara L. Onofrio, Esq.

(57) ABSTRACT

A device for reducing wear to the inner wall of a cyclone separator by causing a protective layer of particulate to accumulate along the inner wall. The protective layer is facilitated by securing an expanded metal sheet along the inner wall of a cyclone separator. Once formed the protective layer of particulate acts as a shield and cushion to high-energy kinetic particles as they continue to enter the cyclone separator. The high-energy particles strike the accumulated particulate without harming the inner wall of the cyclone separator.

10 Claims, 3 Drawing Sheets

ABRASIVE WEAR BARRIER

This application claims priority to Provisional Application 60/055,727 filed Jun. 26, 1997.

FIELD OF INVENTION

This invention relates to cyclone separators, specifically to an improved way of preventing abrasive wear caused by the operation of cyclone separators.

BACKGROUND OF THE INVENTION

In the operation of a cyclone separator, a gas/particulate stream channels tangentially into a cyclone barrel. The circular shape of the barrel imparts a spinning, vortexed flow pattern to the gas/particulate mixture. The gas/particulate mixture travels first to the walls of the barrel, then down along the conical section to the dust outlet. The conical shape of the cyclone separator increases the velocity of the gas/particulate mixture until a vortex is reached and particle free gas starts to rotate up in an inner air column. The high tangential velocity and the decreasing radius of the path create a substantial centrifugal force. This centrifugal force separates the dust from the gas stream due to the difference in density. The particulate exits at the bottom of the separator through a dust port. The gas exits through a gas outlet pipe at the top of the cyclone separator. The effect of the unmitigated flow of hot gas and particles is erosion to the material comprising the barrel walls and cylinder.

Erosion takes place as a result of the impact of the gas borne particles. The particles strike the inner wall of the cyclone separator at a high velocity and scrape along the wall causing wear until friction consumes the kinetic energy of the particle and gravity causes the particle to drop into the collector.

Temperatures inside the cyclone range from 700 degrees to 900 degrees Fahrenheit. Humidity can be between 5% to 30%. The particle size can vary between 20 microns to 150 microns. The velocity of the incoming particulate ranges between 100 feet per second to 200 feet per second. These factors have made it difficult to provide suitable protection to the inner wall of the separator.

Liners on the cyclone walls have been used to mitigate the effect of the abrasive particulate and provide some protection to the inner wall. Variable environmental conditions contribute to the suitability of various liners. Material used to protect the walls of the cyclone must withstand the harsh conditions present within the cyclone separator.

It has been known to use hardplate steel and ceramic tile as liners to protect the inner wall. However, the hardplate wears quickly and causes downtime to the cyclone separator for necessary replacement. The ceramic tile wears relatively well, but adhesion problems are experienced due to the thermal cycling of the separator. During use, the separator reaches up to 900 degrees Fahrenheit. It then cycles back to room temperature when idle. This thermal cycling causes the adhesion to fail and the tiles become detached from the inner wall, leaving the parent metal of the inner wall exposed.

OBJECTS AND ADVANTAGES

Accordingly, several objects and advantages of this invention are to provide a protective barrier to increase the durability of the walls of a cyclone separator. Specifically a barrier that facilitates a buildup of particulate fines that act as an protective layer to mitigate the erosive effects of a hot, high velocity, gas/particulate mixture.

Another object of this invention is provide a device that facilitates the buildup of particulate fines in a cyclone generator in a manner that does not create blocking or impede the action of the separator in any other way.

Still another object of this invention is to provide a simple, low maintenance method of prolonging the life of the parent metal comprising a cyclone separator wall.

Still further objects and advantages will become apparent from a consideration of the ensuing description and accompanying drawings.

SUMMARY OF THE INVENTION

The primary purpose of this invention is to provide a means to prevent erosion of the parent metal comprising the cyclone barrel and cone of a cyclone separator; specifically, the parent metal comprising the inner wall of a cyclone separator. This is accomplished through the use of a barrier of expanded metal shaped to the contour of the inner wall of the cyclone. The barrier is effective at a critical spacing from the parent metal of the cyclone wall. When the barrier is correctly spaced from the inner cyclone wall, a buildup of particulate accumulates in front of the parent metal comprising the cyclone barrel and cone. This buildup of particulate matter acts as a cushion and shield from subsequently incoming particulate matter, which travels at high speeds as it enters the cyclone separator. The high energy incoming particles strike the barrier of accumulated particulate instead of the parent metal. The accumulated particulate absorb the impact of the kinetic particles preventing the kinetic particles from striking the inner cyclone wall. The erosive effect of the incoming particles on the inner wall of the cyclone separator is thereby mitigated. In addition, the striking particles tend to embed in the accumulated particulate instead of scraping along the wall, further reducing the erosion of the inner cyclone wall. Once all of the kinetic energy has been consumed, gravity pulls the particles downward into the collector.

This invention uses the incoming particulate matter itself to form a protective barrier against the eroding factor of the continuous stream of incoming particles. The expanded metal guard is used to facilitate the necessary accumulation of incoming particulate that forms the protective barrier.

DESCRIPTION OF THE PREFERRED EMBODIMENT

In the preferred embodiment, expanded metal is secured along the inner walls of a cyclone separator barrel at a fixed distance from the inner wall generally following the contour of the cyclone separator. FIG. 1 shows a cutaway view of a cyclone separator. Hot gases carrying particulate matter or fines, and forming a gas/particulate mixture 13; enter the cyclone input 7 channeling tangentially into 10 the cyclone barrel. The circular shape of the barrel imparts a spinning, vortexed flow pattern to the gas/particulate mixture. The gas/particulate mixture travels first to a wall created by the barrel and expanded metal secured to the inner barrel wall. Initially the dust and particulate will pass through the openings in the expanded metal and form a buildup of particulate between the barrel wall and the expanded metal. This build up will increase until a protective layer of particulate is formed that spans between the inner wall and the expanded metal. After the particulate layer is formed, the subsequent incoming particles will strike the layer and then proceed down to a conical shaped transition barrel 11.

The conical shape of the cyclone barrel increases the velocity of the gas/particulate mixture until a vortex is reached, and the gas, free from particles, begins to rotate up in an inner air column through the cyclone barrel to exit through a gas outlet pipe 9. The particulate 12 exists through the bottom of the cyclone separator through a dust port 8.

FIG. 2 shows a cutaway of a cyclone separator barrel 1, exposing the expanded metal 2 lining the barrel.

FIG. 3 and FIG. 4 show the proximity of the expanded metal 2 to the cyclone separator barrel 1 and a bolt 4. Bolt 4 is secured to the inner wall of the cyclone separator barrel 1A by a rigid means such as welding. Bolt 4 in conjunction with a washer and a nut, in turn secures expanded metal 2 to the barrel.

FIG. 3 and FIG. 4 also illustrate the penetration of particulate matter 3 through an opening in expanded metal 2 as the kinetic particulate matter travels in a spinning motion indicated by arrow 3B.

FIG. 4 shows the particulate matter 3 built up along the inner wall of the cyclone separator barrel 1A, forming a protective barrier 3A, comprised of generally stationary particulate matter. Once formed, the protective barrier insulates the inner wall from the erosive action caused by the impact of incoming particulate matter.

FIG. 5 shows how bolt 4 can be rigidly attached via a filet weld 16 to the inner wall 1A of the cyclone separator barrel 1. FIG. 5 also illustrates how the expanded metal can be rigidly attached to the barrel wall using a nut 5 on bolt 4 and a washer 6. Spacers 17 determine the amount of space 15 between the inner wall 1A and expanded metal 2.

It is important that expanded metal 2 be correctly spaced 15 in relation to the inner surface of the cyclone barrel 1A. If the expanded metal is placed too close to the inner surface, the required buildup will not result. If the expanded metal is spaced to far from the surface of the inner wall, the particulate buildup is too great and can result in clumping of particulate matter and clogging of the cyclone. Preferred spacing for space 15 is when the expanded metal sheet is spaced at 0.65 inches to 0.85 inches from the surface of the inner wall..

An additional consideration is the size of the opening in the expanded metal 2. If expanded metal is used with openings that are too small, the expanded metal will deflect the particulate and not result in an accumulation of fines. Conversely, if the openings in the expanded metal are too large, the expanded metal will allow the particulate to pass through freely, but will fail to accumulate the particles into the desired protective layer. Accordingly the preferred sizing for the holes in the expanded metal has been determined to be between 0.25 inch and 1.6 inch.

It is also preferred that the expanded metal comprises stainless steel. Stainless steel expanded metal demonstrates superior resistance to wear caused by the kinetic particulate and harsh environmental conditions present in the cyclone separator. Carbon steels will also work satisfactorily in facilitating the creation of the required protective layer of particulate, however the carbon steel experiences a higher incidence of wear as caused by the kinetic particulate. Therefore the carbon steel will require maintenance on a more frequent basis.

REFERENCE NUMERALS

Figure 1:
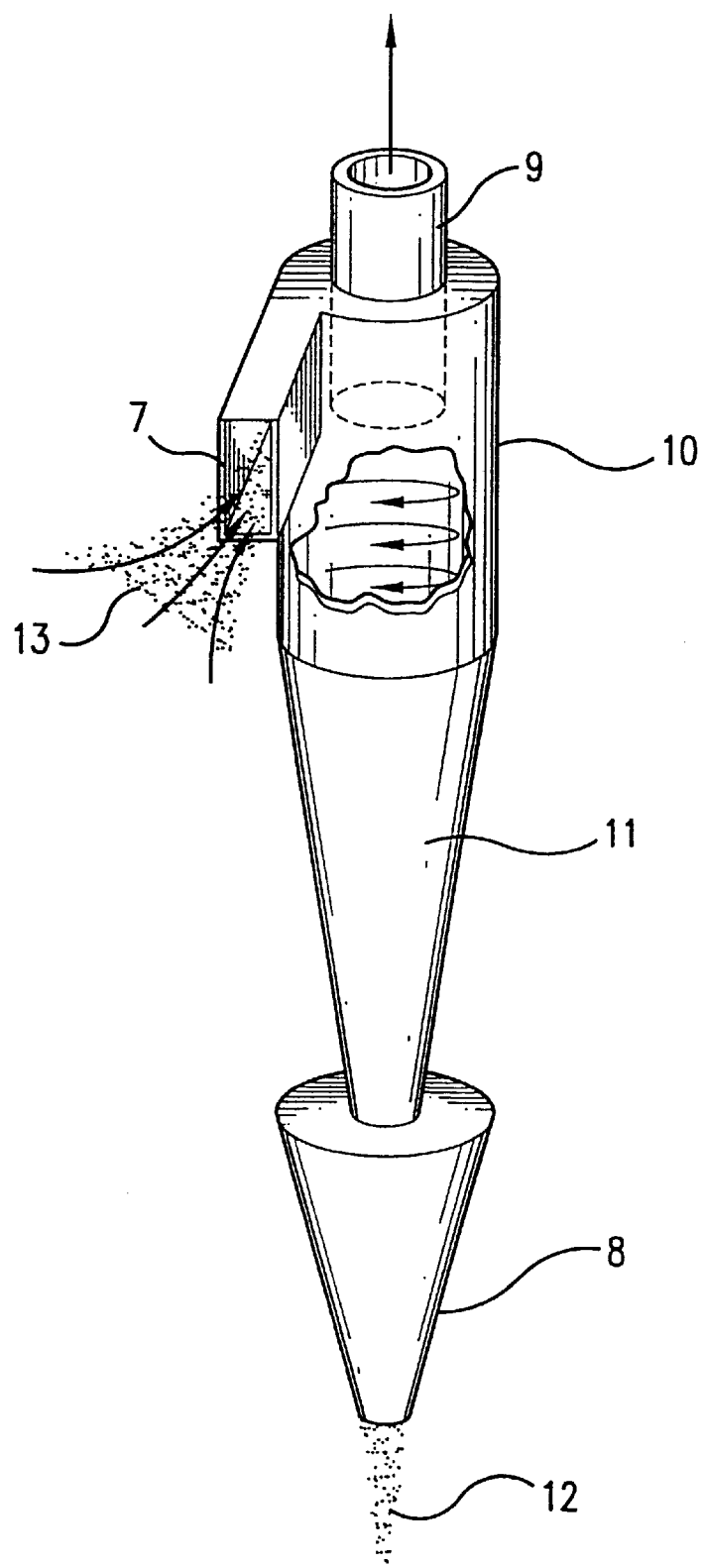
FIG. 1 is a cutaway perspective view showing the basic operation of a cyclone separator.
Figure 2:
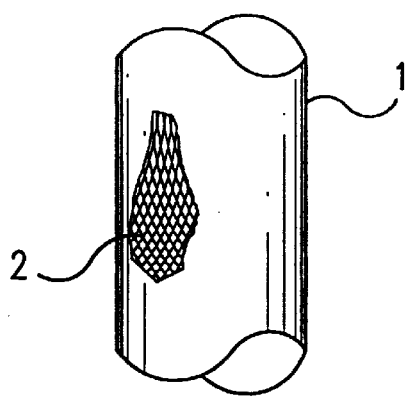
FIG. 2 is a cutaway of a cyclone cylinder section, showing the expanded metal sheet along the inner wall and the openings in the sheet.
Figure 3:
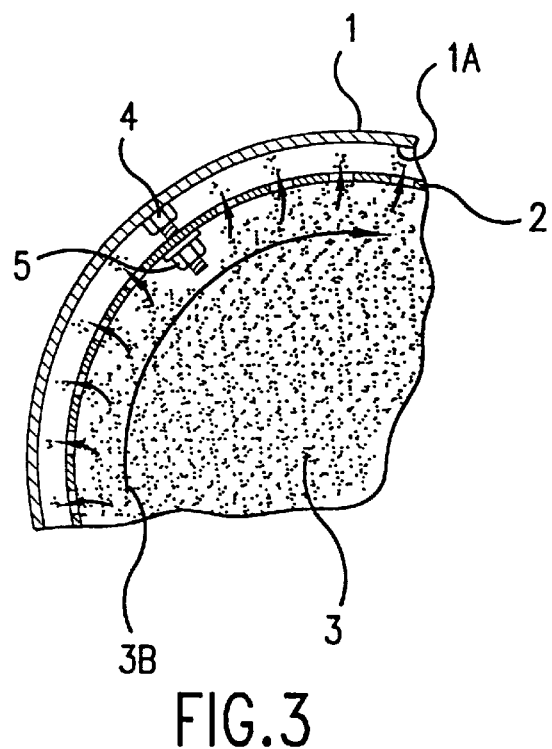
FIG. 3 is a sectional view showing how particulate matter migrates through the openings of the expanded metal.
Figure 4:
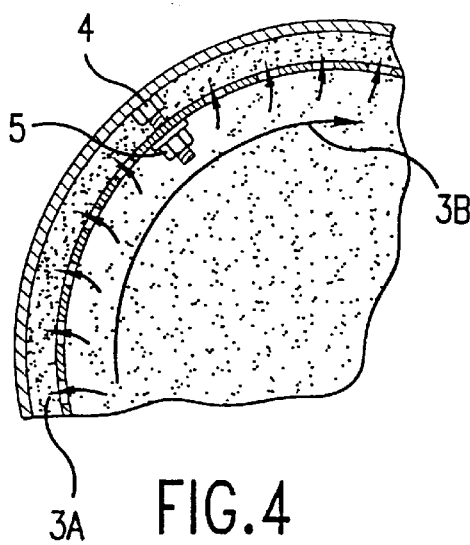
FIG. 4 is a sectional view showing how particulate matter forms a protective layer on an inner surface of a cylinder wall.
Figure 5:
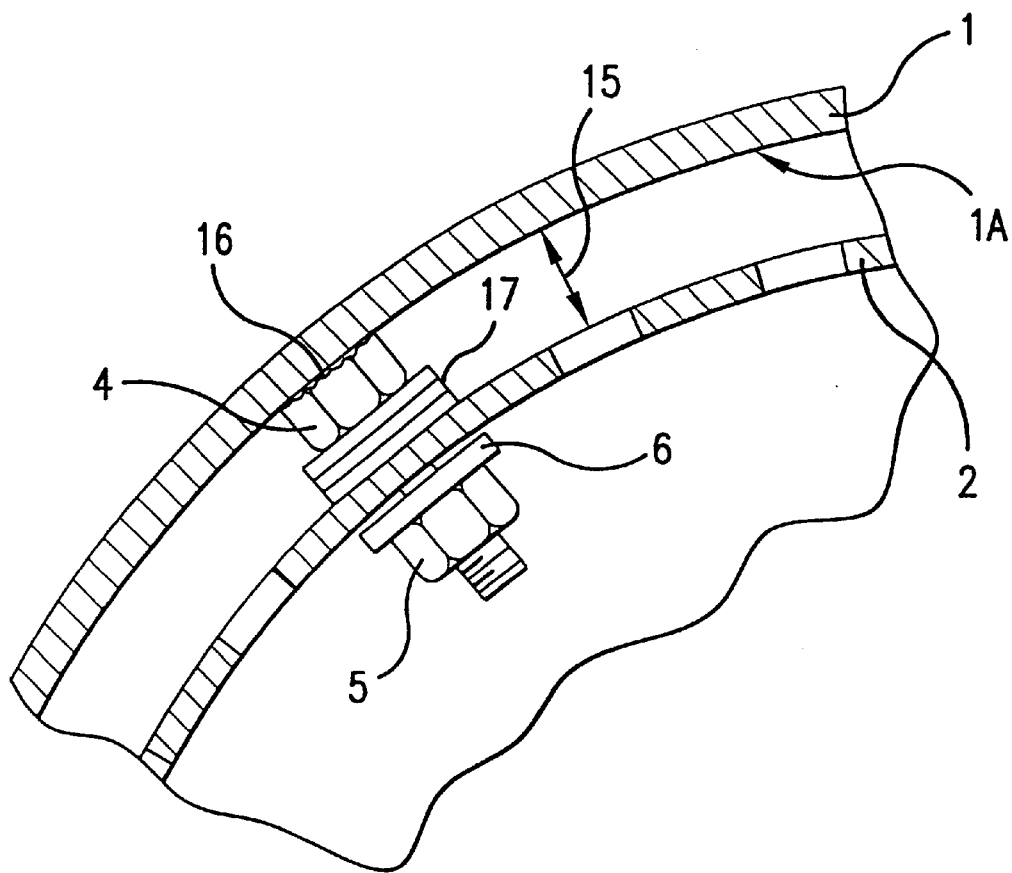
FIG. 5 is a cutaway of a cyclone separator wall showing in detail the expanded metal bolted to the wall and a space between the wall and the expanded metal which is critical to the invention.

1. Parent Metal of the Cyclone Separator Barrel
1A. Inner Surface of Cyclone Barrel
2. Expanded Metal
3. Particulate Matter
3A. Accumulated Particulate Matter or Fines
3B. Spinning motion of Particulate Matter
4. Bolt
5. Nut
6. Washer
7. Inlet to Cyclone Separator
8. Dust Port
9. Gas Outlet Pipe
10. Cyclone Barrel
11. Transition Barrel to Dust Port
12. Particulate
13. Gas/Particulate Mixture
14. Gas
15. Space between Cyclone Separator Wall and Expanded Metal
16. Filet Weld

What is claimed is:

1. An apparatus for protecting an inner wall of a cyclone separator which comprises:

(a) an expanded metal sheet generally formed to the contour of the inner wall of the cyclone separator and having openings of between 0.25 inches and 1.6 inches; and (b) a means of securing said expanded metal sheet to the inner wall of the cyclone separator at a distance of between about 0.25 inches and 1.25 inches;

(c) wherein particulate matter passes through the openings in the metal sheet and form a protective layer of particulate between the expanded metal sheet and the inner wall.

2. The apparatus of claim 1 wherein the expanded metal sheet comprises stainless steel.

3. The apparatus of claim 1 wherein the expanded metal sheet comprises carbon steel.

4. The apparatus of claim 1 wherein the distance of the expanded metal sheet to the inner wall is between 0.5 inches and 1.0 inches.

5. The apparatus of claim 1 wherein the openings in the expanded metal sheet are between 0.5 inches and 1.25 inches.

6. A method of providing protection to an inner wall of a cyclone separator comprising;

a. securing expanded metal along an inner wall of a cyclone separator, wherein the expanded metal has openings of between 0.25 inches and 1.6 inches;

b. spacing said expanded metal at a distance of between about 0.25 inches and 1.25 inches from the inner wall; and c. wherein particulate matter passes through the openings in the expanded metal and form a protective layer of particulate between the expanded metal and the inner wall.

7. The method of claim 5 wherein the expanded metal comprises stainless steel.

8. The method of claim 5 wherein the expanded metal comprises carbon steel.

9. The method of claim 5 wherein the spacing is at a distance of between 0.50 inches and 1.0 inches.

10. The method of claim 5 wherein the openings in the expanded metal are between 0.5 inches and 1.25 inches.

* * * * *